(12) United States Patent
Sharpe et al.

(10) Patent No.: US 7,804,831 B2
(45) Date of Patent: Sep. 28, 2010

(54) RAPID MEDIA CHANNEL CHANGING MECHANISM AND ACCESS NETWORK NODE COMPRISING SAME

(75) Inventors: Randall B. Sharpe, Chapel Hill, NC (US); Ben Crosby, San Jose, CA (US)

(73) Assignee: Alcatel Lucent, Paris (FR)

( * ) Notice: Subject to any disclaimer, the term of this patent is extended or adjusted under 35 U.S.C. 154(b) by 811 days.

(21) Appl. No.: 11/311,046

(22) Filed: Dec. 19, 2005

(65) Prior Publication Data
US 2006/0222323 A1    Oct. 5, 2006

Related U.S. Application Data

(60) Provisional application No. 60/667,357, filed on Apr. 1, 2005.

(51) Int. Cl.
*H04L 12/54* (2006.01)
*H04L 12/28* (2006.01)
*H04J 3/26* (2006.01)

(52) U.S. Cl. .................. 370/390; 370/428; 370/432

(58) Field of Classification Search .......... 370/390, 370/395.4, 428, 429, 432; 725/86, 87, 91, 725/93, 97, 101, 103, 144–147
See application file for complete search history.

(56) References Cited

U.S. PATENT DOCUMENTS

| | | | |
|---|---|---|---|
| 2002/0124258 A1* | 9/2002 | Fritsch | 725/88 |
| 2003/0048808 A1* | 3/2003 | Stahl et al. | 370/487 |
| 2003/0200548 A1* | 10/2003 | Baran et al. | 725/90 |
| 2004/0098748 A1 | 5/2004 | Bo et al. | |
| 2005/0149965 A1* | 7/2005 | Neogi | 725/14 |

FOREIGN PATENT DOCUMENTS

| | | |
|---|---|---|
| EP | 1294193 A | 3/2003 |
| WO | WO 99/09741 A | 2/1999 |

OTHER PUBLICATIONS

Michael Y. M. Chiu et al.; Partial Video Sequence Caching Scheme for VOD Systems etc.; vol. 45, No. 1, Feb. 1998; XP011023329.
Petit G. H. et al; "Bandwidth Resource Optimization etc."; 1st In't Workshop on SanFrncisco,CA; Jul. 13-14, 1994, NY; pp. 91-97 XP010124402.
Novella Bartolini et al.; A Walk Through Content Delivery Networks; vol. 2965, 2004, pp. 1-25, XP019004517; ISBN: 3-540-21945-5; p. 11.

* cited by examiner

*Primary Examiner*—Chirag G Shah
*Assistant Examiner*—Srinivasa R Reddivalam
(74) *Attorney, Agent, or Firm*—Galasso & Associates, LP

(57) ABSTRACT

A method is provided for enabling rapid media stream channel changes in conjunction with increasing network resource utilization efficiency. A media stream is multicast for reception by a plurality of requesting decoders. The media stream includes packets containing groups of pictures (GOPs), which are stored in a buffer of an access node. At least a portion of the packets are unicast from the access node for reception by a new requesting decoder in response to receiving from the new requesting decoder a request for reception designating a media stream identifier corresponding to the media stream. Thereafter, the media stream is multicast to the new decoder after bringing packet transmission of the unicast media stream into alignment with packet transmission of the multicast media stream.

11 Claims, 2 Drawing Sheets

RAPID MEDIA CHANNEL CHANGING MECHANISM AND ACCESS NETWORK NODE COMPRISING SAME

CROSS REFERENCE TO RELATED APPLICATIONS

This patent application claims priority to U.S. Provisional Patent Application having Ser. No. 60/667,357 filed Apr. 1, 2005 entitled "Rapid Video Channel Change Mechanism In Access Node", having a common applicant herewith and being incorporated herein in its entirety by reference. Further, this application is related to a co-assigned U.S. patent application Ser. No. 11/311,081 filed concurrently herewith and entitled "Access Node Capable of Dynamic Channel Caching". The contents of this document are incorporated by reference herein.

FIELD OF THE DISCLOSURE

The disclosures made herein relate generally to communications networks and, more particularly, to media channel changing mechanisms in communications networks.

BACKGROUND

Standard video compression algorithms such as the MPEG2 standard of the International telecommunication Union's Moving Pictures Experts Group and the H.264 of the Video Coding Experts Group compress video sequences known as Groups of Pictures (GOPs). Each GOP has a respective beginning and/or ending boundary and contains video content that lasts a fraction of a second to as long as several seconds. While video is one example of streaming media in the context of the present invention, it is not the only type of streaming media. Broadly, streaming media includes other forms of media such as audio media and non-video forms of visual media.

Channel change latency is important to the satisfactory television viewing experience and other types of streaming media experiences. Switching to a highly compressed digital video stream can take a second or more before the image begins to be displayed. For example, a video decoder cannot begin decoding a video stream until a GOP boundary is recognized. Accordingly, if upon a channel change a decoder begins receiving a new video stream while a GOP transmission of a previous video stream is in progress, the video decoder must wait for the next GOP boundary of that video stream before beginning decoding GOPs of the new stream.

This need to wait for the next GOP boundary increases channel change latency by approximately the "wait time" for the next GOP boundary to present itself. One conventional approach for decreasing the wait time is to have short GOPs so that the wait time is relatively brief. However, compressing video with short GOPs is less efficient than for long GOPs. So, there is a trade off between compression efficiency and channel change latency. Another conventional approach for decreasing the wait time is to begin streaming at the beginning of a GOP upon receipt of a channel change request. However, because channel change requests between different viewers are not synchronous, each media stream must be unicast to a particular decoder, until another mechanism allows alignment and subsequent joining of that unicast media stream to a corresponding multicast media stream.

Conventional approaches for media stream channel changes also adversely impact network resource utilization. In the case where a unicast media stream associated with a channel change originates from a distant source and must traverse core and aggregation networks, then an enormous volume of traffic must be transported. Furthermore, because channel change requests tend to be concentrated on the hour and half hour (i.e., when programs begin), traffic volume associated with channel changes is also extremely variable. Lastly, depending on the channel change concurrency and the duration of unicasting phase associated with channel change requests, network resources that have to be available for rapid channel change may exceed the network resources that are required for the delivery of voice, video, and data services.

Therefore, a media channel changing mechanism that at least partially overcomes drawbacks associated with conventional approaches for changing media channels is useful and advantageous.

SUMMARY OF THE DISCLOSURE

Embodiments of the present invention provide a mechanism for facilitating rapid changing of media channels via an access node, which significantly reduces interoffice traffic. In accordance with the present invention, media stream channel change functionality is implemented via an access node for media streams that are frequently requested and served through the access node. Packets containing Groups of Pictures (GOPs) for such frequently requested media streams are stored in a buffer of the access node, thus enabling at least a portion of the media stream to be unicast from the access node. Unlike conventional rapid channel change techniques that are implemented via a centralized server and that correspondingly impose an enormous amount of traffic across large parts of an associated network, integration of a media channel changing mechanism in the access node advantageously reduces channel change latency and contributes to increased network resource utilization efficiency. By locating rapid channel change functionality for certain channels (e.g., popular channels) in the access node, the amount of traffic crossing the network is dramatically reduced with respect to such conventional rapid channel change techniques. Accordingly, embodiments of the present invention advantageously overcome one or more drawbacks associated with conventional approaches for facilitating rapid channel changing functionality in a communications network.

In one embodiment of the present invention, a method is provided for enabling rapid media stream channel changes in conjunction with increasing network resource utilization efficiency. Packets containing one or more GOPs of a media stream are stored in a buffer of an access node. A request for reception of the media stream is received from a decoder. At least a portion of the packets are unicast from the access node for reception by the decoder.

In another embodiment of the present invention, a method is provided for enabling rapid media stream channel changes in conjunction with increasing network resource utilization efficiency. A media stream is multicast for reception by a plurality of requesting decoders and packets containing one or more Groups of Pictures (GOPs) of the media stream are stored in a buffer of an access node. At least a portion of the packets are unicast from the access node for reception by a new requesting decoder in response to receiving from the new requesting decoder a request for reception designating a media stream identifier corresponding to the media stream.

In another embodiment of the present invention, an access network element comprises at least one data processing device, a buffer connected to the data processing device, memory connected to the data processing device and instructions accessible from the memory and processable by the data processing device. The instructions are configured for enabling the data processing device to facilitate storing packets of a media stream in the buffer, receiving from a decoder a request for reception of the media stream and unicasting at least a portion of the packets from the access node for reception by the decoder in response to receiving the request for reception.

Turning now to specific aspects of the present invention, in at least one embodiment, an operation is performed for assessing information upon which a determination for storing the packets of the media stream in the buffer is made such that storing of the packets of the media stream is performed in response to the information indicating that the packets of the media stream should be stored in the buffer.

In at least one embodiment of the present invention, an operation is performed for assessing information for determining whether the packets of the media stream stored in the buffer correspond to a media stream identifier designated in the request for reception such that unicasting of the packets of the media stream is performed in response to determining that at least a portion of the packets of the media stream stored in the buffer correspond to the media stream identifier designated in the request for reception.

In at least one embodiment of the present invention, an operation is performed for forwarding the request for reception from the access node for reception by a more centrally located network element in response to determining that none of the packets of the media stream stored in the buffer correspond to the media stream identifier designated in the request for reception.

In at least one embodiment of the present invention, an operation is performed for multicasting a designated media stream to a new decoder after bringing packet transmission of a unicast media stream into alignment with packet transmission of the multicast media stream corresponding to the unicast media stream.

In at least one embodiment of the present invention, unicasting of packets is performed in a manner such that packet transmission of the unicasting is in alignment with packet transmission of a corresponding media stream being provided to a plurality of other decoders via multicasting and such that the media stream is provided to the decoder via the multicasting after the packet transmission of the unicasting is brought into alignment with packet transmission of the corresponding multicast media stream.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
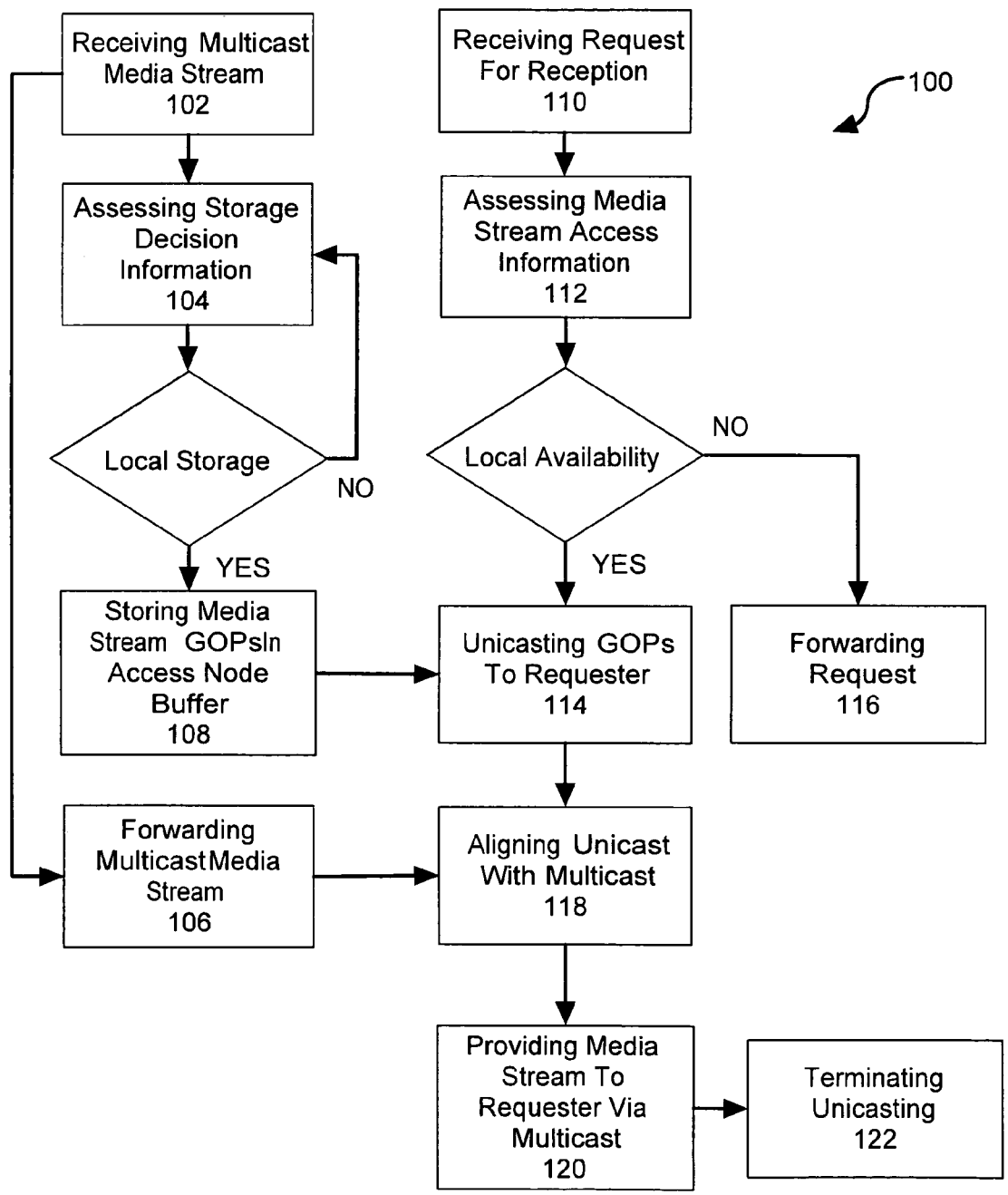
FIG. 1 depicts an embodiment of a method for facilitating rapid media channel change functionality in accordance with the present invention.

FIG. 1 depicts an embodiment of a method in accordance with the present invention, which is referred to herein as the method 100. The method 100 is performed by an access node of an access network and provides for facilitating rapid media stream channel changes via channel change functionality residing at an access node. A television channel is a preferred embodiment of such a media stream channel. In doing so, the method 100 advantageously reduces channel change latency and contributes to increased network resource utilization efficiency thereby overcoming one or more drawbacks associated with conventional approaches for changing media channels in a communications network.

The method 100 begins an operation 102 for receiving a multicast media stream such as, for example, a multicast video stream. The media stream comprises a stream of packet groups referred to in the art as Groups of Pictures (GOPs). In response to receiving the media stream, an operation 104 is performed for assessing storage decision information upon which a determination of whether or not to store packets of the media stream in a buffer of the access node is made and an operation 106 is simultaneously performed for forwarding the multicast media stream (i.e., packets of the media stream) to recipients downstream of the access node. For clarity, it should be understood that what is being assessed is whether or not to temporarily store all received packets of the media stream as they are received and what is not being assessed is whether or not to store selected packets of the media stream. Examples of such storage decision information includes, but are not limited to, static configuration indicating that packets of a particular media stream should be stored, a particular number of requests for receiving the media stream received at the access node within a specified period of time, the number of recipients presently viewing the video stream, historic viewership information for the media stream, etc. Although it is disclosed herein that media streams can be statically selected or dynamically determined due to factors such as, for example, popularity, it is also disclosed herein that the present invention is not limited to a particular means of facilitating such selection and/or determination.

In response to assessment of the storage decision information indicating that the packets of the media stream should be stored in the buffer, an operation 108 is performed for storing packets of the media stream in the buffer of the access node. The operation 108 for storing includes continually storing in the buffer the packets of the media stream most recently received at the access node. Thus, at any point in time while the media stream is being multicast, the most recently received GOPs of the media stream are available for being retrieved for enabling rapid media channel changing functionality in accordance with the present invention to be performed.

In one embodiment, storage of packets corresponding to the most recent several seconds of the media stream is sufficient for enabling media channel changing functionality in accordance with the present invention. A buffer in accordance with the present invention can functionally be thought of as a delay line or a circular buffer. A delay line provides the functionality of introducing a calculated delay into the transmission of a signal. A circular buffer provides the functionality of holding data written by one process and read by another. In such cases, separate read and write pointers are used that are not allowed to cross each other so that unread data cannot be overwritten by new data. When the circular buffer is filled, new data is written starting at the beginning of the buffer.

Because most viewers spend the majority of their time primarily watching a common set of channels, storing of packets of the media streams in the access node for only the most popular channels provides significant benefit with respect to network resource utilization. Advantageously, facilitating channel changing in accordance with the present invention does not require all media stream channels to be available (i.e., stored) at the access node. The method is configured for continually or periodically assessing the storage decision information for determining conditions in which the media stream is to be stored in the buffer. Accordingly, in response to assessment of the storage decision information indicating that the packets of the media stream should not be stored in the buffer, the operation 104 for assessing storage decision information is repeated in either a continuous or periodic manner.

It is disclosed herein that rapid media channel changing functionality in accordance with the present invention is not limited to one media stream. Within a single access node, rapid media channel changing functionality in accordance with the present invention may be facilitated for a plurality of media channels. A single buffer may be suitably configured and/or utilized for facilitating such rapid media channel changing functionality or, optionally, a plurality of buffers may be suitably configured and/or utilized for facilitating such rapid media channel changing functionality.

Still referring to FIG. 1, an operation 110 is performed for receiving from a requesting decoder (e.g., a decoder of a subscriber set top box (STB)) a request for reception of the media stream. The request for reception is transmitted from the requesting decoder upstream for reception by a network element configured for and capable of facilitating delivery of a media stream designated in the request to the requesting decoder. The request for reception includes a media stream identifier such as an identifier of a channel, an identifier for a media stream title, an identifier for a media stream reference number etc. In response to receiving the request for reception, an operation 112 is performed for assessing information for determining whether or not the packets of the media stream stored in the buffer correspond to the media stream identifier designated in the request for reception. An operation 114 is performed for unicasting the packets of the media stream for reception by the requesting decoder in response to determining that at least a portion of the packets of the media stream stored in the buffer corresponds to the media stream identifier designated in the request for reception. Unicasting of the packets of the media stream includes retrieving the packets from the buffer and begins at the GOP boundary of the most recent GOP that is in the process of being received stored in the buffer. It is disclosed herein that the complete GOP does not need to be in the buffer at the time when unicasting begins. Such buffering functionality can be accomplished through the use of a circular buffer or delay line. In this manner, the same media content being multicast via the operation 106 is provided to the requesting decoder by the operation 114 for unicasting the packets of the media stream.

An operation 116 is performed for forwarding the request for reception from the access node for reception by a more centrally located network element (i.e., closer to the core of the access network or within the aggregation network) in response to determining that none of the packets of the media stream stored in the buffer correspond to the media stream identifier designated in the request for reception. Optionally, the set-top box knows which server is responsible for which streams. Thus, an access node will not receive request for streams that it doesn't have and won't have to forward such requests to other servers. In accordance with such optional functionality, the operation 116 is omitted.

Unicasting consumes unnecessary network resources in the case where the media stream is concurrently being multicast to other decoders. Accordingly, it is advantageous for all decoders receiving a particular media stream from a source serving the media stream through the access node to receive such media stream exclusively through a single multicast, as opposed to one or more decoders receiving the media stream via separate unicasts. Accordingly, an operation 118 is performed for performing the unicasting such that packet transmission of the unicasting is in alignment with packet transmission of the media stream being multicast (i.e., a corresponding media stream being multicast via the same access node). After the packet transmission of the unicast media stream is brought into temporal alignment with packet transmission of the corresponding multicast media stream, an operation 120 is performed for providing the media stream to the requesting decoder via the multicast video stream, followed by an operation 122 being performed for terminating the unicasting of the packets of the media stream.

This alignment can be accomplished by transmitting the unicast stream at faster than real-time. However, this approach is implemented at the expense of consumption of scarce DSL bandwidth capacity. Alternatively, alignment can be accomplished by intelligently discarding packets that cause little damage to the reconstructed video thereby bringing the temporal alignment of the unicast media stream into alignment with that of the multicast media stream. For instance, B-frames generally make up about half of the frames within a GOP and their absence is seldom visually noticeable.

In accordance with the present invention, transmitting the unicast stream at faster than real-time enables delay between multicasting of media stream and unicasting of the video stream to be pushed from the access node to the requesting decoder. Through transmitting the unicast stream at faster than real-time, a buffering device of the requesting decoder is made to serve as a delay device. Once transmission of the unicast media stream at the access node is brought into temporal alignment with transmission of the multicast media stream at the access node, the requesting device begins receiving the media stream via the multicasting and unicasting of the media stream is terminated. As outputting of the media stream during playback is performed at real-time speed, playback via the requesting decoder is time delayed with respect to playback on decoders that earlier began receiving the media stream via multicasting. Thus, displayed images outputted by the requesting decoder will be time delayed with respect to such decoders that earlier began receiving the media stream via multicasting.

In view of the disclosures made herein a skilled person will appreciate that that displayed content from the requesting decoder could be of earlier time, same time, or later time compared to other decoders receiving the same media stream. The specific temporal relationship of displayed content for different decoders will depend on when respective channel changes were requested relative to time of the most recent GOP boundary. For example, a first decoder may have requested a channel where the GOP boundary was most of a GOP in the past while a second decoder may have requested a channel where the GOP boundary just occurred whereby the first decoder will be delayed with respect to the second decoder.

Optionally, if there is sufficient bandwidth between the access node and the decoder, unicasting via the buffer can be used indefinitely. This would not be feasible for a rapid channel change solution deployed at a more central point in the network. However, it is entirely feasible through implementation of rapid channel change functionality in accordance with the present invention.

Figure 2:
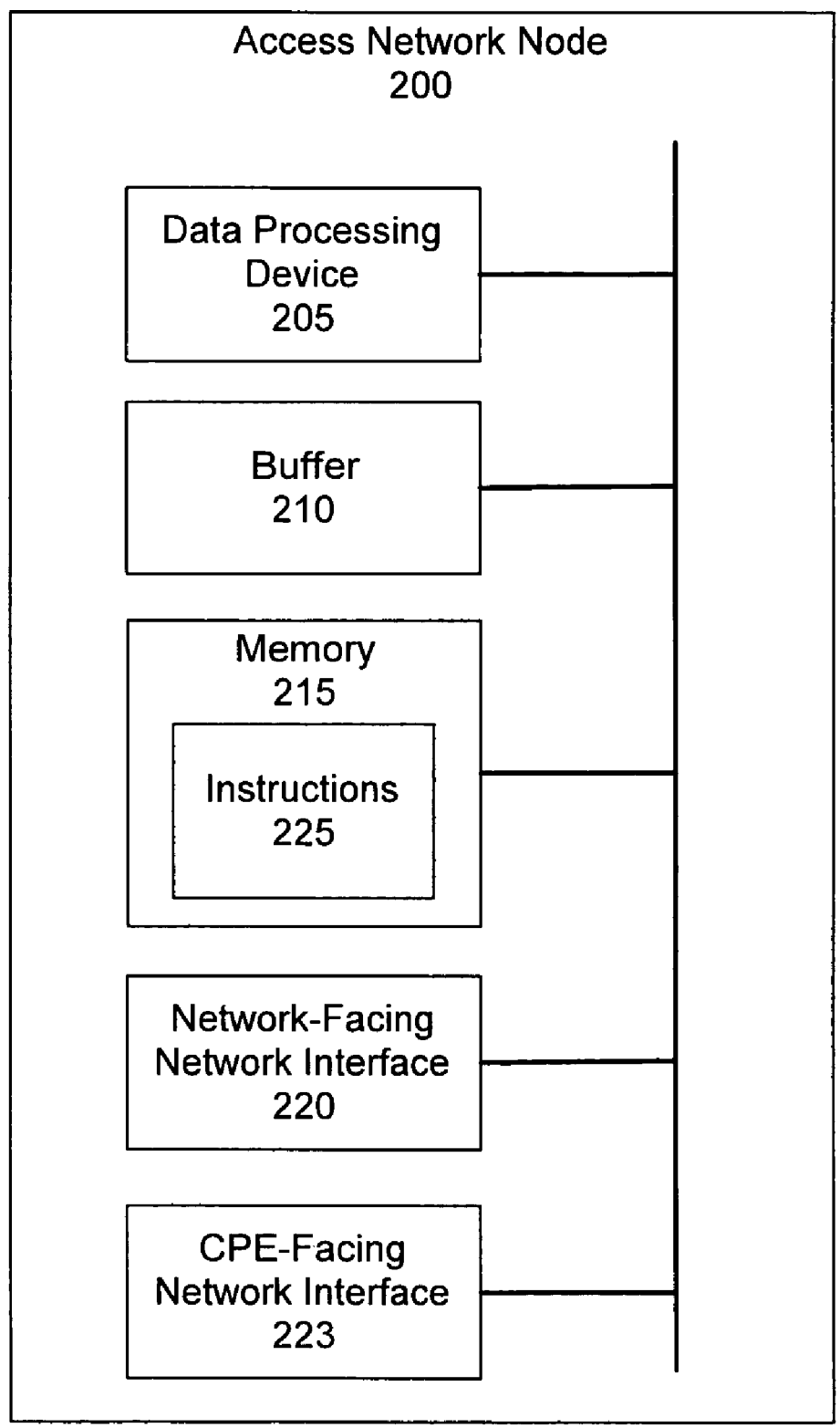
FIG. 2 depicts an embodiment of an access network node configured for carrying to the method for facilitating rapid media channel change functionality depicted in FIG. 1.

FIG. 2 depicts an embodiment of an access network node (i.e., access node) in accordance with the present invention, which is referred to herein as the access network node 200. As will be discussed in greater detail below, the access network node 200 is configured for carrying out rapid channel change functionality in accordance with the present invention. For example, the access network node 200 is suitably configured for enabling the method 100 discussed above in reference to FIG. 1 to be carried out.

The access node 200 includes a data processing device 205, a buffer 210, memory 215, a network-facing network interface 220 and a CPE (customer premise equipment) facing network interface 223. The data processing device 205, the buffer 210, the memory 215, the network-facing network interface 220 and the CPE-facing network interface 223 are interconnected for enabling interaction therebetween. The network-facing network interface 220 receives media stream packets from an upstream source and the CPE-facing network interface 223 forwards media stream packets for reception by downstream customer premise equipment.

Residing in the memory 210 is instructions 225 for, among other functionality, carrying out rapid media channel change functionality in accordance with the present invention. The instructions 225 are accessible from within the memory 215 and are processable by the data processing device 205. The instructions 225 are configured for enabling the data processing device 205 to facilitate the operations of storing packets of a media stream in the buffer 210, receiving from a decoder a request for reception of the media stream and unicasting at least a portion of the packets from the access network node for reception by the decoder in response to receiving the request for reception. Transmission operations such as multicasting, unicasting, receiving request for receptions and forwarding request for receptions are facilitated via the network interface 220.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method, comprising:

storing packets of a media stream in a buffer of an access node, wherein said packets are stored based on decision information used to determine whether or not to temporarily store all received packets of the media stream as the buffer receives them and wherein said decision information includes at least one of a particular number of requests for receiving the media stream received at the access node within a specified period of time and a number of recipients presently viewing the video stream when such media stream is received by the buffer;

receiving from a decoder a request for reception of the media stream; and unicasting at least a portion of said packets of the media stream from the access node directly to the decoder in response to receiving the request for reception; and performing said unicasting such that packet transmission of said unicasting is in temporal alignment with packet transmission of a corresponding media stream being provided to a plurality of other decoders via multicasting from the access node, wherein unicasting said packets such that packet transmission of said unicasting is in temporal alignment with packet transmission of said corresponding multicast media stream includes selectively discarding a portion of said unicast packets;

providing the media stream to the decoder via said multicasting after said packet transmission of said unicasting is brought into temporal alignment with packet transmission of the corresponding media stream; and terminating said unicasting.

2. The method of claim 1, further comprising: assessing storage decision information upon which a determination for storing said packets of the media stream in the buffer is made, wherein said storing is performed in response to said storage decision information indicating that said packets of the media stream should be stored in the buffer and wherein said storage decision information includes at least one of a number of requests for receiving the media stream received at the access node within a specified period of time, and a number of recipients presently viewing the video stream, and historic viewership information for the media stream.

3. The method of claim 1, further comprising: forwarding the request for reception from the access node for reception by a more centrally located network element in response to determining that none of said packets of the media stream stored in the buffer correspond to the media stream identifier designated in the request for reception.

4. The method of claim 1, further comprising: assessing information upon which a determination is made for storing said packets of the media stream in the buffer, wherein said storing is performed in response to said information indicating that said packets of the media stream should be stored in the buffer.

5. The method of claim 1, further comprising: assessing information for determining whether said packets of the media stream stored in the buffer correspond to a media stream designated identifier in the request for reception, wherein said unicasting is performed in response to determining that at least a portion of said packets of the media stream stored in the buffer correspond to the media stream identifier designated in the request for reception; and forwarding the request for reception from the access node for reception by a more centrally located network element in response to determining that none of said packets of the media stream stored in the buffer correspond to the media stream identifier designated in the request for reception.

6. A method, comprising:

multicasting a media stream for reception by a plurality of requesting decoders; storing packets of the media stream in a buffer of an access node, wherein said packets are stored based on decision information used to determine whether or not to temporarily store all received packets of the media stream as the buffer receives them and wherein said decision information includes at least one of a particular number of requests for receiving the media stream received at the access node within a specified period of time and a number of recipients presently viewing the video stream when such media stream is received by the buffer; and unicasting at least a portion of said packets of the media stream from the access node for reception by a new requesting decoder in response to receiving from the new requesting decoder a request for reception designating a media stream identifier corresponding to the media stream; and providing the media stream to the new decoder via said multicasting after bringing packet transmission of said unicasting into temporal alignment with packet transmission of said multicasting, wherein unicasting said packets such that packet transmission of said unicasting is in temporal alignment with packet transmission of said corresponding multicast media stream includes selectively discarding a portion of said unicast packets.

7. The method of claim 6, further comprising: forwarding the request for reception from the access node for reception by a more centrally located network element in response to determining that none of said packets of the media stream stored in the buffer correspond to the media stream identifier designated in the request for reception.

8. An access network element, comprising:
at least one data processing device;
a buffer connected to said at least one data processing device;
memory connected to said at least one data processing device;
a network-facing network interface connected to said at least one data processing device;
a CPE-facing network interface connected to said at least one data processing device and instructions accessible from said memory and processable by said at least one data processing device, wherein said instructions are configured for enabling said at least one data processing device to facilitate: storing packets of a media stream in the buffer, wherein said packets are stored based on decision information used to determine whether or not to temporarily store all received packets of the media stream as the buffer receives them and wherein said decision information includes at least one of a particular number of requests for receiving the media stream received at the access node within a specified period of time and a number of recipients presently viewing the video stream when such media stream is received by the buffer; receiving from a decoder a request for reception of the media stream; and
unicasting at least a portion of said packets of the media stream from the access node for reception by the decoder in response to receiving the request for reception;
wherein said instructions are further configured for enabling said at least one data processing device to facilitate: performing said unicasting such that packet transmission of said unicasting is in temporal alignment with packet transmission of a corresponding media stream being provided to a plurality of other decoders via multicasting from the access node, wherein unicasting said packets such that packet transmission of said unicasting is in temporal alignment with packet transmission of said corresponding multicast media stream includes selectively discarding a portion of said unicast packets; and providing the media stream to the decoder via said multicasting after said packet transmission of said unicasting is brought into temporal alignment with packet transmission of the corresponding media stream.

9. The access network element of claim 8 wherein: said instructions are further configured for enabling said at least one data processing device to facilitate determining whether said packets of the media stream stored in the buffer correspond to a media stream identifier designated in the request for reception; and said unicasting is performed in response to determining that at least a portion of said packets of the media stream stored in the buffer correspond to the media stream identifier designated in the request for reception.

10. The access network element of claim 9 wherein said instructions are further configured for enabling said at least one data processing device to facilitate forwarding the request for reception from the access node for reception by a more centrally located network element in response to determining that none of said packets of the media stream stored in the buffer correspond to the media stream identifier designated in the request for reception.

11. The access network element of claim 8 wherein said instructions are further configured for enabling said at least one data processing device to facilitate determining whether said packets of the media stream stored in the buffer correspond to a media stream identifier designated in the request for reception; said unicasting is performed in response to determining that at least a portion of said packets of the media stream stored in the buffer correspond to the media stream identifier designated in the request for reception; and said instructions are further configured for enabling said at least one data processing device to facilitate forwarding the request for reception from the access node for reception by a more centrally located network element in response to determining that none of said packets of the media stream stored in the buffer correspond to the media stream identifier designated in the request for reception.

* * * * *